United States Patent
Gulden et al.

(10) Patent No.: US 7,948,431 B2
(45) Date of Patent: May 24, 2011

(54) RADIOBASED LOCATING SYSTEM PROVIDED WITH A SYNTHETIC APERTURE

(75) Inventors: Peter Gulden, München (DE); Stephan Max, Clausthal-Zellerfeld (DE); Martin Vossiek, Hildesheim (DE)

(73) Assignee: Symeo GmbH, Munich (DE)

( * ) Notice: Subject to any disclaimer, the term of this patent is extended or adjusted under 35 U.S.C. 154(b) by 417 days.

(21) Appl. No.: 11/813,369

(22) PCT Filed: Sep. 7, 2005

(86) PCT No.: PCT/EP2005/054420
§ 371 (c)(1),
(2), (4) Date: Jan. 30, 2009

(87) PCT Pub. No.: WO2006/072471
PCT Pub. Date: Jul. 13, 2006

(65) Prior Publication Data
US 2010/0141506 A1    Jun. 10, 2010

(30) Foreign Application Priority Data
Jan. 4, 2005   (DE) .................. 10 2005 000 732

(51) Int. Cl.
*G01S 13/74* (2006.01)
(52) U.S. Cl. .......... 342/42; 342/118; 342/125; 342/126; 342/133; 342/139
(58) Field of Classification Search .............. 342/25, 342/118–146
See application file for complete search history.

(56) References Cited

U.S. PATENT DOCUMENTS

| | | | |
|---|---|---|---|
| 5,216,429 A | 6/1993 | Nakagawa et al. | |
| 5,327,140 A | 7/1994 | Buckreuβ | |
| 5,748,891 A | 5/1998 | Fleming et al. | |
| 5,991,460 A | 11/1999 | Mitchell | |
| 6,037,893 A | 3/2000 | Lipman | |
| 6,054,950 A | 4/2000 | Fontana | |
| 6,246,932 B1 * | 6/2001 | Kageyama et al. | 701/24 |

(Continued)

FOREIGN PATENT DOCUMENTS
DE        33 24 693 A1    1/1985
(Continued)

OTHER PUBLICATIONS

Vossiek et al., "An Ultrasonic Multielement Sensor System for Position Invariant Object Identification," Ultrasonics Symposium, 1994. Proceedings., 1994 IEEE Cannes, France Nov. 1-4, 1994, New York, NY, USA,IEEE, US, Bd. 2, Nov. 1, 1994, Seiten 1293-1297, XP010139788 ISBN: 0-7803-2012-3.
(Continued)

*Primary Examiner* — Thomas H Tarcza
*Assistant Examiner* — Timothy A Brainard
(74) *Attorney, Agent, or Firm* — Drinker Biddle & Reath LLP

(57) ABSTRACT

The invention relates to a method for increasing the accuracy of a measurement of a radio-based locating system comprising a mobile station and at least one fixed station, wherein the movement of a mobile station from an initial position is detected by way of measuring data of an absolute sensor system and a relative sensor system, a virtual antenna is embodied in the form of synthetic aperture by way of measuring data and the mobile station is focused on the fixed station and/or vice versa by using the synthetic aperture.

20 Claims, 3 Drawing Sheets

U.S. PATENT DOCUMENTS

| | | | |
|---|---|---|---|
| 6,522,890 B2 | 2/2003 | Drane et al. | |
| 2002/0049539 A1* | 4/2002 | Russell et al. | 701/301 |
| 2004/0032363 A1* | 2/2004 | Schantz et al. | 342/127 |
| 2004/0149036 A1* | 8/2004 | Foxlin et al. | 73/511 |
| 2006/0256009 A1* | 11/2006 | Wengler et al. | 342/378 |

FOREIGN PATENT DOCUMENTS

| | | |
|---|---|---|
| DE | 42 25 413 C1 | 3/1994 |
| DE | 195 12 787 A1 | 9/1996 |
| DE | 199 10 715 A1 | 9/2000 |
| DE | 199 46 168 A1 | 4/2001 |
| DE | 100 54 180 A1 | 5/2002 |
| DE | 101 55 251 A1 | 6/2003 |
| DE | 102 25 894 A1 | 2/2004 |
| EP | 0 550 073 A2 | 7/1993 |
| GB | 1 605 409 | 6/1996 |
| JP | 06-201813 A | 7/1994 |
| JP | 2003-240846 A | 8/2003 |
| WO | WO 01/23906 A1 | 4/2001 |
| WO | WO 01/67625 A1 | 9/2001 |
| WO | 03/069367 A1 | 8/2003 |
| WO | WO 2005/098465 A2 | 10/2005 |

OTHER PUBLICATIONS

Vossiek, et al., "Wireless Local Positioning," IEEE Microwave Magazine IEEE USA, Bd. 4, Nr. 4, Dec. 2003, Seiten 77-86, XP002388470.

Stelzer et al., "RF-Sensor for a Local Position Measurement System," Nondestructive Detection and Measurement for Homeland Security Mar. 4-5, 2003 San Diego, CA, USA, Bd. 5048, März 2003, Seiten 136-144, XP002388471 Proceedings of the SPIE—The International Society for Optical Engineering SPIE-Int. Soc. Opt. Eng USA.

Katyl, "Compensating Optical Systems. I. Broadband Holographic Reconstruction," Applied Optics USA, Bd. 11, Nr. 5, May 1972, Seiten 1241-1247, XP002388472.

Klausing et al., "H. Radar mit realer and synthetischer Apertur," Oldenbourg, Chapter 8, pp. 213-227 (2000).

Stelzer et al., "A New Technology for Precise Local Position Measurement—LPM," In: Microwave Symposium Digest, IEEE MTT-S International, vol. 2, pp. 655-658, Jun. 6-11, 2004.

* cited by examiner

RADIOBASED LOCATING SYSTEM PROVIDED WITH A SYNTHETIC APERTURE

BACKGROUND

The present invention concerns a radio-based positioning system comprising one mobile station and at least one stationary station, and particularly for determination of the spatial position of the mobile station, and a method to increase the measurement precision of the radio-based positioning system.

Radio-based positioning systems are known in many embodiments; for example, "Wireless Local Positioning" by the authors M. Vossiek, L. Wiebking, P. Gulden, J. Wieghardt, C. Hoffmann and P. Heide, which appeared in Microwave Magazine of the IEEE (volume 4, issue: 4, December 2003, page 77-86) ("Wireless Local Positioning"), provides an overview.

Radio-based positioning systems function such that radio signals are exchanged between a mobile station and mostly a plurality of stationary stations. Either the relative distances between the mobile and one or more stationary stations or the relative angles between the mobile and every two stationary stations are determined based on the received radio signals. The spatial position of the mobile station can then be determined by way of trilateralization or triangulation on the basis of these measurement values.

Given a radio-based positioning system, a significant problem exists in that the radio signals here must largely propagate undirected in space. This is required since the relative position between the mobile unit and the stationary unit is not known in advance (for example, in contrast to radio links). However, the undirected emission of radio waves leads to the situation that the signals between the mobile unit and the stationary unit can be transferred not only via the shortest direct path but rather, for example, can be reflected on walls or objects and therefore also can be transferred via detoured routes.

Under the circumstances, a large corruption of the positioning result results from these detours. This problem, known as the multi-lane or, respectively, multi-path problem, is particularly critical given an interior application and is the leading factor that limits the achievable precision of radio-based positioning systems. As is also stated, for example, in the aforementioned article by M. Vossiek, et al., however, many applications that require a high measurement precision exist in the interior situation, and particularly in the field of virtual reality and automation engineering. Such applications are only to be executed in a very limited manner or not at all with the radio positioning systems known or available today.

It is also known that assisting sensors (for example, acceleration sensors, gyroscopes, odometers, compass sensors, inclination sensors, yaw sensors, linear or angle encoders, etc.) can be used very advantageously to improve the precision of radio positioning systems. These assisting sensors are for the most part relative sensors, thus those that determine not absolute position but rather the variations relative to an initial position in a reference space. These multi-sensor or, respectively, hybrid systems for the most part operate such that the measurement information of the different sensors can be combined with the measurement data of the radio positioning system (for example, in a Kalman filter) based on movement models.

From an information technology view, what is disadvantageous in such systems is that the individual end results are linked with one another instead of the raw data of the sensors, such that information can possibly be lost via the processing in the sensors. If, for example, the radio sensor were to determine a wrong distance value due to a critical multi-path situation, this strongly error-ridden value would enter into the evaluation/combination. The error could possibly be recognized and reduced via the hybrid approach, however the starting basis of the evaluation would be enduringly impaired via the incorrect measurement value.

SUMMARY

It is the object of the present invention to develop a positioning system according to a method for increasing the measurement precision of a radio-based positioning system comprising a mobile station and at least one stationary station, such that a high measurement precision is achieved and particularly a reduction in the measurement value corruption as a consequence of further reflections which are generated in addition to the direct signal transmission paths between mobile and stationary stations.

The object is achieved via a method and device described below.

Via detection of a movement of the mobile station, which movement starts from a starting position and serves as the spanning of a synthetic aperture, which detection ensues via measurement data of an absolute sensor system and a relative sensor system, the aperture or, respectively, the spatial extent (in particular of its antenna) is mathematically enlarged by way of the relative sensor system, and a synthetic aperture is therewith generated via an embodiment of the invention.

The following describes novel hybrid positioning systems and methods given which the measurement data of radio positioning systems are combined in a particularly advantageous manner with the aid of measurement data of an assisting relative sensor system before they are supplied to the continuing processing. The method very effectively reduces interferences due to multi-path effects and therewith presents a nearly optimal combination of a relative sensor system with a radio-based absolute sensor system.

Various embodiments of the present invention particularly concerns what is known as TOA (time of arrival) or, respectively, RTOF (round trip time of flight) radio positioning systems. Given the TOA systems (for instance GPS), the separation between the stations is determined via a one-way delay measurement between two stations; given RTOF, the separation between the stations is determined via a two-way delay measurement between the stations. Particularly advantageous embodiments of such systems are found in the relevant literature regarding GPS systems or in U.S. Pat. Nos. 5,216,429; 5,748,891; and 6,054,950; Great Britain patent document no. GB 1 605 409, German patent document no. DE 3 324 693, international patent publication no. WO 2001 167625 and particularly with respect to international patent application no. PCT/DE00/03356;, German patent application nos. DE 19 946168.6; DE 10 155 251.3, WO 2005/ 098465 A2 or DE 100 54 180, collectively, "the referenced patent documents".

Specifically, an absolute sensor system or, respectively, radio measurement technology is designed such that it leads to measurement signals which represent the amplitude and the phase of the transferred signal dependent on the signal delay or, respectively, dependent on the length of the transmission path, as this is typically the case in nearly all radar systems. Whether the representation is shown continuously over time, discretely, or only using a limited number of value pairs (more complex amplitude value, time) is secondary. For simplification, in particular, all conceivable TOA or RTOF radio positioning measurement assemblies that deliver such signals are comprised here under the term "secondary radar". Naturally, TOA systems do not represent secondary radar in the classical sense, but the signals in the TOA system acquisition stations are typically similar (in terms of appearance and information content) to the signals in secondary radars, which is why a common approach is reasonable from an information- and system-related view.

The measurement signal of such a secondary radar (thus of a TOA or RTOF system) is designated in the following as a measurement signal or echo profile, independent of the detail signal type. Various magnitude maxima or values in an echo profile are to be associated with various transmission paths with different signal delays. The direction and the magnitude of a position change relative to the original position of a mobile station can be quantified by way of a relative sensor system.

The inventive method is based on the method of the synthetic aperture. The general principle of SAR (synthetic aperture radar) is, for example, presented in detail in the reference book "H. Radar mit realer and synthetischer Apertur" by Klausing and W. Holpp (Oldenbourg, 2000) in chapter 8, p. 213 and the following. Nearly identical methods are known in the field of medicine or ultrasound measurement technology under the terms holography or, respectively, tomography. For example, for a description of the latter methods, reference is made to "M. Vossiek, V. Mágori and H. Emert, "An Ultrasonic Multielement Sensor System for Position Invariant Object Identification", presented at IEEE International Ultrasonic Symposium, Cannes, France, 1994.

According to various embodiments of the invention, the known methods with synthetic aperture for the purpose of a radio-based positioning are expanded to the extent that signals reflected in an interfering manner on arbitrary objects are not passively processed into an image; rather, only actively reflected signals that were acquired from different measurement positions are superimposed and then serve for the purpose of a radio positioning.

According to an advantageous embodiment, a use of the synthetic aperture ensues via suitable selection of the size of the aperture and/or the amplitude and/or phase weighting of the measurement data of the absolute sensor system for generation of a direction behavior of the synthetic aperture, such that its direction diagram lies nearly homogeneously in the region of an error ellipse of the absolute sensor system. The direction diagram lies nearly homogeneously in the region of an error ellipse of a preceding position measurement that was executed with an arbitrary mechanism.

According to a further advantageous embodiment, an alternative use of the synthetic aperture ensues via reverse calculation or, respectively, mapping ensuing from a known position of the stationary station to unknown positions of the mobile station, which reverse calculation or, respectively, mapping ensues by way of a method of synthetic aperture, in particular by way of a broadband holographic mapping method. In addition to a distance measurement, an angle measurement value can be generated via such a method.

According to a further advantageous embodiment, an alternative use of the synthetic aperture ensues via a reverse calculation or, respectively, mapping of known positions of the mobile station to an unknown position of the stationary station.

According to an advantageous method or, respectively, an advantageous device, distance and angle information calculated between mobile station (in particular a secondary radar) and stationary station (in particular a transponder). The method steps are executed via correspondingly provided devices.

According to an advantageous method or, respectively, an advantageous device, the distance and angle data of one or more mobile stations, in particular of the transponder or transponders in a secondary radar, are fused by way of a Kalman filter for one or more positions. The method steps are executed via correspondingly provided devices.

According to an advantageous method or, respectively, an advantageous device, the stationary stations (in particular transponders) are executed as passive back-scatter tags and an absolute position determination according to distance and angle ensues relative to the secondary radar. The method steps are executed via correspondingly provided devices.

According to an advantageous embodiment, a repetition of the step sequences ensues to improve the position determination of the mobile station.

According to an advantageous embodiment, an initial rough focusing ensues by way of a measurement value of an absolute and/or relative sensor system.

According to an advantageous embodiment, an initial rough focusing ensues by way of information of preceding measurement data.

According to an advantageous embodiment, for reverse calculation or, respectively, mapping of a point b(x, y, z) of the first (in particular stationary) station, the measured acquisition signal $E_n(\omega)$ is correlated with the theoretical function $F_n(a_n, r, \omega)$ that a first (in particular stationary) station (that is ideally assumed as a punctiform reflector) would generate at the position $r=(x, y, x)^T$ considered from the measurement point $a_n=(x_n, y_n, z_n)^T$ of the second (in particular mobile) station.

An advantageous device to increase the measurement precision of a radio-based positioning system comprising one mobile and at least one stationary station superimposes the echo profiles (originating from a plurality of different transmission paths) of at least one secondary radar with the assistance of a plurality of different associated position data of the relative sensor system for generation of a synthetic aperture in the form of a virtual antenna.

According to an advantageous embodiment, at least two stationary stations are provided so that lateralization data can be generated.

According to an advantageous embodiment, the mobile station is formed by a secondary radar and the at least one stationary station is formed by a transponder, such that a "self-positioning" system is generated.

According to an advantageous embodiment, the mobile station is formed by a transponder and the at least one stationary station is formed by a secondary radar, such that a "remote-positioning" system is generated.

According to an advantageous embodiment, a data transmission device is provided to transfer data from at least one secondary radar to the signal processing device.

DESCRIPTION OF THE DRAWINGS

The present invention is exemplarily described using exemplary embodiments with reference to Figures and appertaining description below.

DETAILED DESCRIPTION OF THE PREFERRED EMBODIMENTS

Figure 1:
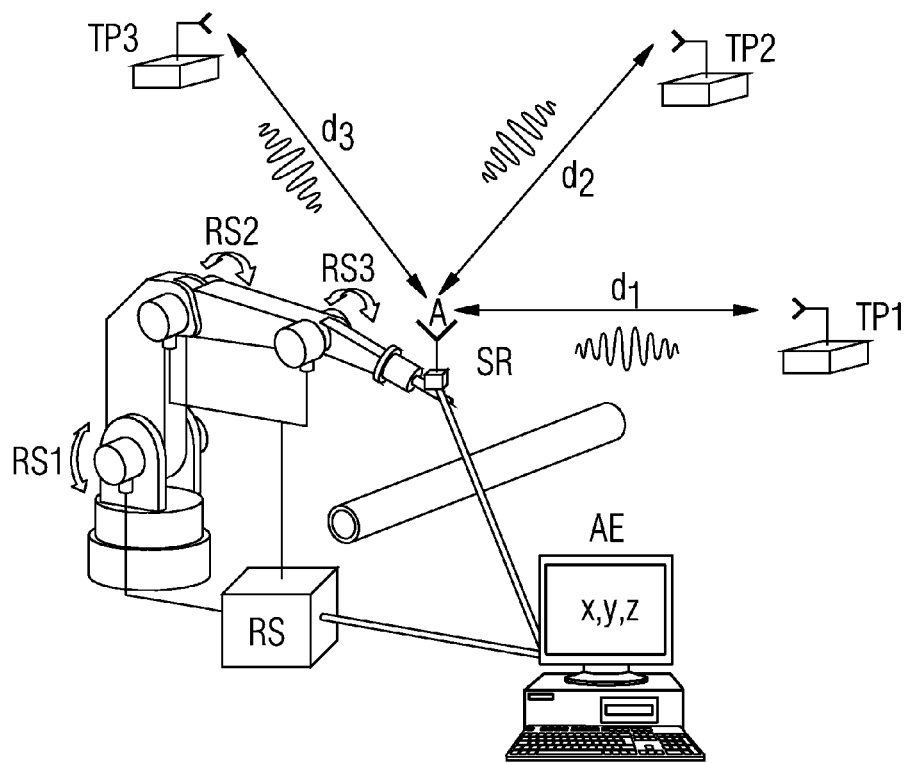
FIG. 1 is a pictorial illustration of a first exemplary embodiment for position determination (self-positioning)

Various embodiments of the inventive methods are presented using a sensor system for positioning of robot arms. FIG. 1 shows such a typical robot. FIG. 1 shows a first exemplary embodiment for position determination by way of a "self-positioning" system using which a method to increase the measurement precision of a radio positioning system can be described in a simple manner. Given "self-positioning" systems, the actual measurement unit (secondary radar SR) is located in a mobile apparatus or, respectively, in the mobile station, such that the mobile apparatus thus determines its own position. Stationary stations are fashioned by way of transponders TP. The position information of the other unmeasured side can be provided via radio communication. AE designates an evaluation unit. Distances are designated with d. A is an antenna.

Such a design is presented in FIG. 1, in which the secondary radar SR is located on the mobile object (thus here, for example, on the grabber of the robot arm). Three transponders TP are provided as stationary stations. The robots are additionally supplied via a relative sensor system RS, for example, with a plurality of angle encoders RS1, RS2, RS3 on each joint, such that the direction and the magnitude of the position change relative to the original position can be quantified.

The method can be described using what is known as a "self-positioning" system. For an absolute positioning, the rotary encoders available today in a reasonable cost framework are not sufficiently precise since their errors accumulate over larger travel paths. Additionally, there are frequently imprecisions due to mechanical deformations. Typical apparatuses/systems with relative sensors therefore deliver:

1) a good repetition precision,
2) a very good precision with regard to small position changes,
3) however poor absolute position values given free movements over a larger region.

Especially the latter problem 3) is solved by various embodiments of the present invention via the utilization of the property 2) in connection with a radio positioning system as previously described.

According to various embodiments of the invention, the property 2) is utilized to the effect that a synthetic aperture is spanned by the movement of the mobile system. It is hereby decisive that it is not necessary for this to know the absolute position of the antenna A of the secondary radar SR—for calculation of a synthetic aperture, it suffices to know the relative coordinates of the aperture support points relative to an arbitrary reference point (for example the start point of the measurement); however, the most varied relative sensors supply precisely this information in an advantageous manner.

When a synthetic aperture has been spanned with the secondary radar in connection with the movement, it is possible to subsequently focus the radio signal comparably (compared with the nearly undirected wave propagation in a typical radio positioning individual measurement) very sharply (in a directional sense) on a nearly arbitrary point in space in computational ways; this means that a situation is computationally generated as if a measurement had been made with a directionally exact physical antenna for a transponder. It is known that the use of directionally exact antennas leads to a significant reduction of the multi-path problem.

Since the position of the transponder is initially unknown, it is generally not possible to computationally set up the focus on the transponder. According to various embodiments of the invention, a synthetic aperture according to two alternatives is used.

Alternative 1

Via the employed sensor system, meaning the relative sensor system and/or the radio positioning sensor system or, respectively, absolute sensor system, in a basic embodiment according to the prior art, it is in all cases possible to at least roughly determine the position of the transponder. A typical error ellipse that characterizes the error range to be expected of the positioning measurement can be estimated according to the first alternative.

One can consequently assume with a certain security that the transponder remains somewhere within a spatial sector that is described by the measurement value and the error ellipse. The transmission/reception direction of the synthetic aperture is now computationally aligned on the whereabouts of the transponder that were roughly measured before. Via a suitable selection of the size of the aperture and possibly via suitable amplitude weighting of the measurement signals, it is also ensured that the direction diagram of the synthetic aperture is nearly homogeneous in the region of the error ellipse and thus advantageously strongly dies off near the error ellipse and there has only low secondary maxima.

How a specific direction behavior is generated via the size of the aperture as well as via amplitude and phase weighting of the acquired signals given a synthetic aperture is known to the experts, for example, via the literature listed above. A virtual antenna is thus generated that is directed towards the transponder as directionally-exactly as possible, however as undirected as possible based on the imprecise, error-plagued prior information.

The increase of the directional sharpness of the radio transmission leads to a significant reduction of the multi-path errors. The "improved" measurement signals that are generated with the aid of the synthetic aperture can then be quite normally supplied to a typical positioning algorithm according to the known prior art. For a spatial positioning, the described method must be applied to at least two transponders in order to receive the necessary lateralization data. In order to improve the prior information—thus in order to be able to focus in a more directionally precise manner—it would be conceivable to draw upon information from preceding measurements. The prediction of the expected new whereabouts could, for example, ensue with the aid of a Kalman filter, like the estimation of the size of the error ellipse.

Alternative 2

The second version to determine of the position of the transponder is to implement a type of imaging. This means that all transponders located in space are mapped into an image region b(x, y, z) with the aid of the moved secondary radar. Since the image region has a known relation to the position of the secondary radar, the relative bearing of the secondary radar to the transponders (that are located at constant positions) is directly determined by the mapping of the transponders and thus its absolute orientation in space is extrapolated. It is hereby advantageous that it is theoretically sufficient (given a suitable two-dimensional movement of the secondary radar) to map only one transponder in order to determine the 3D position of the secondary radar.

This can be very advantageous for applications given which it is not possible (for cost or coverage reasons) to span a good trilateralization base. When the distance and direction of a plurality of transponders relative to the secondary radar are determined using the imaging, these values can be very normally supplied to a typical superordinate positioning algorithm according to any prior art. All known imaging synthetic aperture methods and algorithms can be applied for mapping of the transponders.

Figure 2:
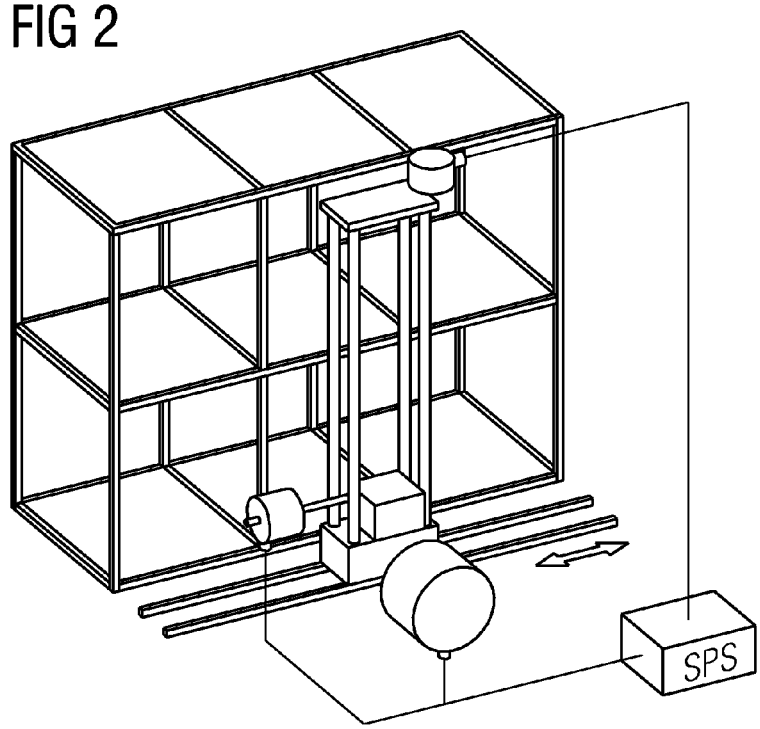
FIG. 2 is a pictorial illustration of a second exemplary embodiment for position determination (self-positioning)

For illustration, a further, similarly based positioning application is shown in FIG. 2. Moreover, however, the inventive arrangements and method can also be transferred to entirely different applications such as, for instance, the organization of motor vehicles, forklifts, cranes, persons from mobile end apparatuses such as cell phones, laptops and many others.

Figure 3:
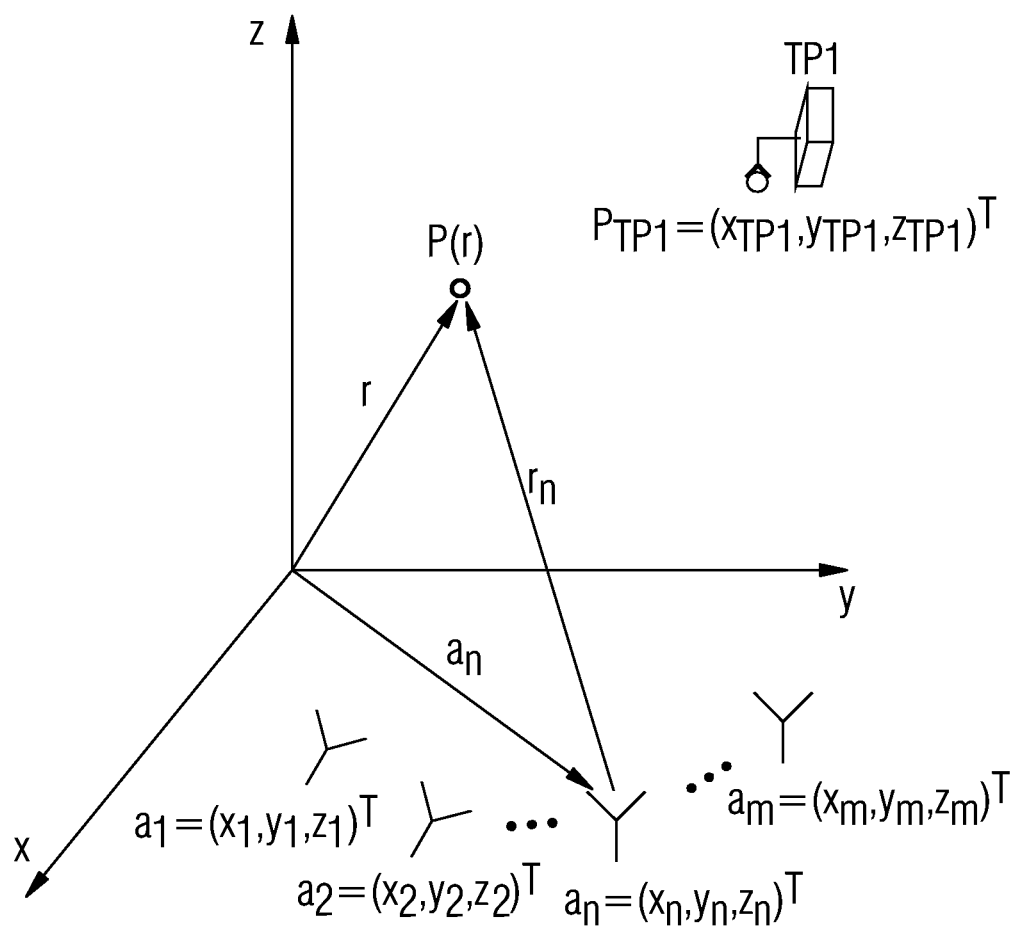
FIG. 3 is a graphic spatial representation for position mapping by way of a broadband holographic mapping method.

All known imaging synthetic aperture methods and algorithms can be applied and transferred to the present application for mapping of the transponders TP. In the following one variant with what is known as the broadband holographic imaging method is presented as an exemplary embodiment. FIG. 3 serves for explanation of the acquisition situation.

As was previously indicated, the data acquisition ensues such that a secondary radar respectively emits a signal from the position $a_n = (x_n, y_n, z_n)^T$. For reasons of clarity, it is initially assumed that the secondary radar receives the signal sent back from the transponder at the same position $a_n$. A transfer to an arrangement with separate transmission antenna and reception antenna would easily be possible, for example with the aid of the literature listed above. Such a measurement procedure should then be implemented from M various measurement positions ($a_n$ with n=1 . . . M). The measurement consequently leads to a group of M different measurement signals (echo profiles) that are called $e_n(t)$ or, respectively, the associated spectrum $E_n(\omega)$ in the following.

The true position of the transponder, which position is to be determined in an ideal manner via the measurement, is $P_{TP1} = (x_{TP1}, y_{TP1}, z_{TP1})^T$.

Further simplifications are assumed for a compact representation:

The measurement region in which the transponder can reside is limited to a spatial region in which it is ensured that the transponder can be detected by the secondary radar from all positions $a_n$.

In the following, a uniform, constant direction behavior of all antennas that is not directionally dependent is assumed.

The basis for modeling of the transmission channel is an ideal AWGN channel. This means that the echo profile $e_n(t)$ received by the radar can be described with a model in which the acquisition signal results as a linear superposition of P amplitude-weighted and time-delayed transmission signals, whereby the index p characterizes the various transmission paths (direct path and multi-path detours) from the secondary radar to the transponder and back.

$$e_n\left(t = \alpha_n \cdot \sum_{P=1}^{P} \alpha_p \cdot s(t - \tau_n - \tau_p) + n(t)\right)$$

where $\alpha_n$ is an attenuation constant characteristic for every measurement path n.

$\alpha_p$ should additionally account for the attenuation for each of the p transmission paths, beyond the normal basic attenuation.

$\tau_n$ is the signal delay characteristic for the measurement path n (this means the signal delay from the direct shortest path from the secondary radar to the transponder and back).

$\tau_p$ should additionally account for possible delay extensions due to multiple reflections for each of the p transmission paths.

n(t) describes additive superimposed interferences (additive white Gaussian noise AWGN).

If the equation for the transmission model is transformed in the frequency domain, it yields:

$$E_n(\omega) = \alpha_n \cdot \sum_{P=1}^{P} \alpha_p \cdot S(\omega) \cdot e^{-j\cdot\omega\cdot\tau_n} \cdot e^{-j\cdot\omega\cdot\tau_p} + N(\omega).$$

The basic delay $\tau_n$ at an arbitrary point in time $r = (x, y, z)^T$ and back is calculated according to $$\tau_n = \frac{2 \cdot |r_n|}{c} \text{ and}$$

$$|r_n| = |r - a_n| = \sqrt{(x - x_n)^2 + (y - y_n)^2 + (z - z_n)^2},$$

whereby c is the propagation speed of the wave.

The broadband holographic reconstruction algorithm is based on a type of optimal filtering. For calculation of an image point b(x, y, z), the measured acquisition signal $E_n(\omega)$ is correlated with the theoretical function $F_n(a_n, r, \omega)$ that a transponder would generate, which transponder is ideally assumed as a punctiform reflector viewed at the position $r = (x, y, z)^T$ from the measurement point $a_n = (x_n, y_n, z_n)^T$. This correlation/comparison function then delivers a large value insofar as the acquisition signal resembles the theoretical signal, which is the case when a transponder is actually located at the position r, thus the assumed image point r actually corresponds to the position of the transponder $P_{TP1} = (x_{TP1}, y_{TP1}, z_{TP1})^T$.

A type of probability value that says whether a transponder is present or not present at the position r results via summation of the correlation results for all M measurement paths. The reconstruction rule thus reads:

$$b(x, y, z) = \left|\sum_{n=1}^{M} \int E_n(\omega) \cdot F_n^{-1}(a_n, r = (x, y, z)^T, \omega) d\omega\right|.$$

The inverse filter selected here for signal comparison (as a type of correlation) corresponds (with regard to the exponential propagation term) to the typically-employed matched filter approach (this means multiplication with the conjugated complex signal, thus $F^*_n(a_n, r, \omega)$. Based on the previously described transmission model and disregarding the additive interferences, the signal $F_n(a_n, r, \omega)$ of a fictional transponder in r results in:

$$F_n(a_n, r, \omega) = \sum_{P=1}^{P} \alpha_n \cdot \alpha_p \cdot S(\omega) \cdot e^{-j\cdot\omega\cdot\tau_n} \cdot e^{-j\cdot\omega\cdot\tau_p}$$

Furthermore, it is assumed that the transmission signal is $S(\omega=1)$, which is possible without limitation of the general applicability since possible non-ideal properties of the transmission signal (at least in the transmission range of interest) could be compensated via the approach of the inverse filter shown above.

If this signal hypothesis is now inserted into the reconstruction rule introduced above, it follows that:

$$b(x, y, z) = \left| \sum_{n=1}^{M} \int E_n(\omega) \cdot \sum_{P=1}^{P} \alpha_n \cdot \alpha_p \cdot e^{-j\omega(\tau_n + \tau_p)} d\omega \right|.$$

If t is substituted for $\tau_n + \tau_p$ and if the sum over p is drawn before the integral, one recognizes that the integral over the angular frequency u corresponds to an inverse Fourier transformation and thus supplies the acquisition signal at the point in time $t = \tau_n + \tau_p$. Since the signal detours $\tau_p$ up to the direct path (at which $\tau_p = 0$) are unknown, the signal model is reduced to this path. The ultimate reconstruction rule consequently reads:

$$b(x, y, z) = \left| \sum_{n=1}^{M} e_n(t = \tau_n) \right|$$

It is to be noted that possible real acquisition signals must be expanded into a complex signal before the summation in order to be able to thus determine the envelope of the image function, thus a type of "brightness function". The calculation of the complex signal can ensue with the aid of the Hilbert transformation.

The gained expression can be interpreted very descriptively. If a transponder is actually located at the position r, its response signal in the echo profile $e_n(t)$ thus respectively occurs at the point in time $t = \tau_n$. Due to the delay summation over the M measurement paths, its signal contributions are coherently superimposed via the reconstruction rule such that a larger value results for b(x, y, z). In contrast to this, possible signal portions of other transponders not positioned in r, signal portions of multi-path reflections or noise overlap incoherently due to the inconsistent delays and thus led to a significantly smaller image signal. In order to be able to be sure that an incoherent superposition of a plurality of echo signals leads to a small amplitude, it is required that the number of the measurement points M is not selected too small.

It is easy to show that nearly all simplifications made in the course of the derivation are not necessary and thus also real, non-ideal system properties could be accounted for relatively simply if this should be necessary. For example, a spatially-dependent direction behavior of the radar antenna and a frequency-dependent transmission function of the measurement system could be accounted for via an inverse filter.

An interesting side effect of the method of the variant 2) is that it is not absolutely necessary to operate the transponder in time, frequency or code multiplex. Given normal radio positioning systems, this is necessary in order to preclude that transponder signals mutually interfere or, respectively, that the overlapping of a plurality of transponder signals leads to incorrect results in the measurement station. Various embodiments of the inventive method inherently deliver what is known as space-division multiple access. When the transponders are spatially removed from one another so far that they are spatially separately resolved in the mapping due to the synthetic aperture, they can consequently also be differentiated without a further encoding.

A "self-positioning" arrangement has previously been discussed in the statements. Since the inventive method always deals with a relative association of the coordinates of the radar and the transponder, it is immediately clear that the arrangement can also be reversed into a remote positioning system.

A method for position determination of a stationary secondary radar is thereby determined via a preceding rough determination of the absolute position of at least one secondary radar by way of determining its position relative to the absolute position of a stopped single transponder after a mapping of all secondary radars in an image region by way of movement of the transponder, determination of the position of the stopped transponder relative to the constant secondary radar located at known positions, and estimation of the absolute position of the stopped transponder based on this.

Figure 4:
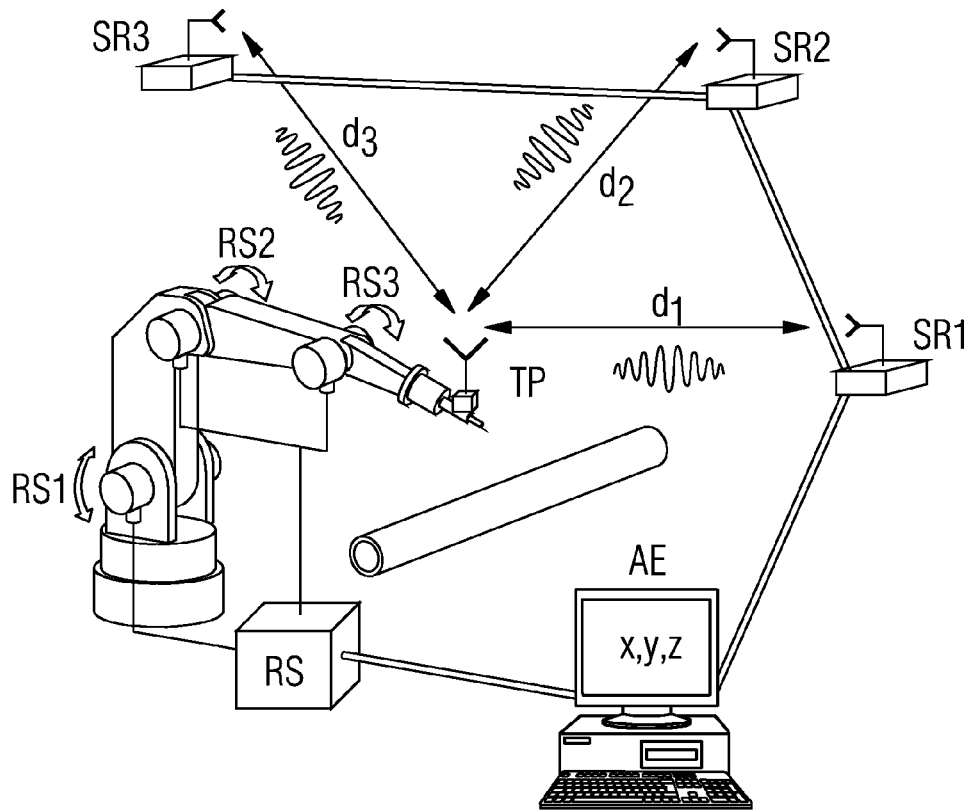
FIG. 4 is a pictorial illustration of a fourth exemplary embodiment for position determination (remote-positioning)

FIG. 4 shows a further possible exemplary embodiment of a radio positioning system whose measurement precision is increased by way of an inventive method. In contrast to FIG. 1, FIG. 4 shows a "remote-positioning" system. Given "remote-positioning" systems, stationary stations possess measurement units (SR) and thus then determine the position of the mobile apparatus or, respectively, of the mobile station (TP) from the outside. In this system, the position information could likewise be provided to the other (non-measuring) side via radio communication.

In the present case, the information of the relative sensor system must be transferred to the stationary secondary radars or, respectively, the secondary radars must transfer their echo profiles to a central evaluation unit, whereby the evaluation unit implements one of the aforementioned methods with the aid of the information of the relative sensor system.

Figure 5:
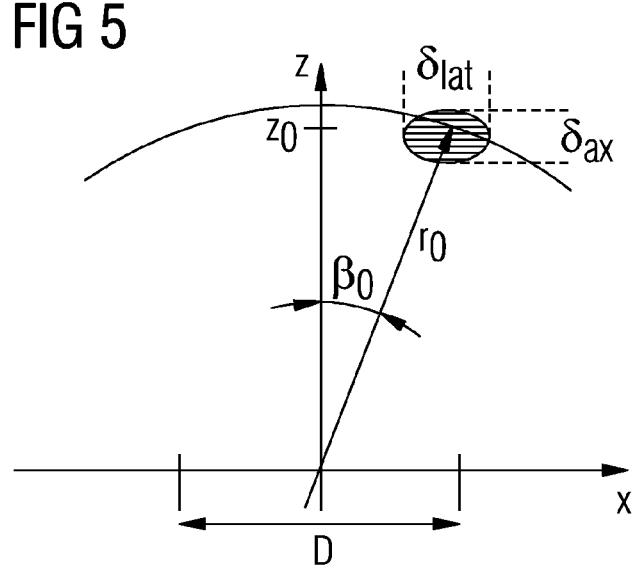
FIG. 5 is a graphic representation for estimation of the resolution of broadband holographic methods.

In the following, a few more base formulae for dimensioning of the system are presented, whereby the parameters are presented by FIG. 5.

Since synthetic aperture methods are based on a coherent superimposition of measurement signals, a necessary condition for the application of the methods exists in that all measurement positions $a_n (x_n, y_n, z_n)^T$ must be known relative to one another with a deviation $\delta_{Pos}$, well below the size of the wavelength $\lambda$. If this condition is breached, a targeted coherent superimposition of the signals is no longer possible. For example, a typical stipulation is:

$$\delta_{Pos} < \frac{\lambda}{8} < \frac{c}{f_m \cdot 8},$$

whereby $f_m$ designates the center frequency of the measurement signal.

The following specifications are found in the literature regarding estimation of the resolution to be expected of broadband holographic methods.

The lateral resolution (see FIG. 5 for explanation) is approximately $$\delta_{lat} \sim \frac{z_0 \cdot c}{D \cdot f_m},$$

the axial resolution (see FIG. 5 for explanation) is approximately $$\delta_{ax} \sim \frac{c}{\Delta f},$$

whereby the employed variables are defined as follows:

$z_0$: median distance from the aperture plane to the acquisition region,

D: length of the aperture, c: wave propagation speed, $f_m$: center frequency of the measurement signals, $\Delta f$: bandwidth of the measurement signals.

In the following, the characteristics are considered for a system that operates at the median frequency of 5.8 GHz and with a bandwidth of 100 MHz and that should be used for a robot application as is, for instance, shown in FIG. 1: the operating range of the robot is limited to a spatial range in which $Z_0$ is at maximum 4 m. A synthetic aperture of 20 cm, for example, should be spanned by the movement of the robot arm.

In the present case, the achieved lateral resolution of approximately 1 m is distinctly better than the axial resolution. The latter is one of the definitive characteristics in typical radio positioning systems according to the delay principle. It is taken into account that the precision of the position determination via interpolation methods is typically 1-2 orders of magnitude below the resolution value; it can thus be estimated that a measurement according to various embodiments of the inventive method for only a single transponder already lead to a measurement uncertainty of only a few cm, at least when the shortest direct transmission path is present with sufficient level. The precision would rise even further via a combination of measurements from a secondary radar at a plurality of transponders and/or measurements from a plurality secondary radars at least one transponder, such that measurement uncertainties in the millimeter or sub-millimeter range can be achieved.

According to the formulae presented above, the requirements for the measurement precision of the relative sensor system would be absolute $\delta_{Pos} < 6.5$ mm, thus relative 3% related to the aperture size, which is a moderate requirement for typical rotary encoders.

A 433 MHz system for positioning of motor vehicles is considered next. The operating range of the motor vehicle is limited to a spatial region in which $Z_0$ should be at maximum to 100 m. A synthetic aperture of 1 m, for example, should be spanned by the movement of the motor vehicle. The requirement for the measurement precision of the relative sensor system would in this lie at approximately <10 cm, thus relative in relation to the aperture size of <10%, which would be achieved with typical odometers and navigation sensors.

The last example would, for example, also be transferred to mobile end apparatuses (laptops, WLAN, Bluetooth, mobile radio apparatuses, etc.) carried by people. In this case acceleration sensors or gyros could be used as relative sensors, for example.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". The word mechanism is intended to be used generally and is not limited solely to mechanical embodiments. Numerous modifications and adaptations will be readily apparent to those skilled in this art without departing from the spirit and scope of the present invention.

The invention claimed is:

1. A method for increasing measurement precision of a radio-based position determination system comprising a mobile station and at least one stationary station, the method comprising:

detecting a movement of the mobile station starting from an initial position, the detecting utilizing measurement data of an absolute sensor system and a relative sensor system;

generating a virtual antenna in a form of a synthetic aperture utilizing the measurement data by relative coordinates to a reference point, and focusing either: a) the mobile station on the stationary station or; b) the stationary station on the mobile station, the focusing utilizing the synthetic aperture;

wherein the absolute sensor system is generated from at least one secondary radar and at least one transponder; and wherein either: c) the mobile station is the secondary radar and the at least one stationary station is the transponder or; d) the mobile station is the transponder and the at least one stationary station is the secondary radar.

2. The method according to claim 1, further comprising:
utilizing the synthetic aperture via a suitable selection of at least one of a size of the aperture, the amplitude, and phase weighting of the measurement data of the absolute sensor system for generating a direction behavior of the synthetic aperture, such that its direction diagram lies nearly homogeneously in a region of an error ellipse of an arbitrary preceding position measurement.

3. The method according to claim 2, further comprising:
performing an initial rough focusing utilizing a measurement value of at least one of an absolute sensor system and a relative sensor system.

4. The method according to claim 2, further comprising:
performing an initial rough focusing utilizing information of preceding measurements.

5. The method according to claim 1, further comprising:
utilizing the synthetic aperture via a reverse calculation ensuing from a known position of the stationary station to unknown positions of the mobile station, which reverse calculation ensues via a mapping method with synthetic aperture, via a broadband holographic mapping method.

6. The method according to claim 5, wherein:
for reverse calculation of a point b(x, y, z) of a first station, the method further comprising:
correlating a measured acquisition signal $E_n(\omega)$ with a theoretical function $F_n(a_n, r, \omega)$ that a first station would generate at a position $r = (x, y, x)^T$ considered from the measurement point $a_n = (x_n, y_n, z_n)^T$ of the second station.

7. The method according to claim 6, further comprising utilizing a reconstruction rule according to the following equation:

$$b(x, y, z) = \left| \sum_{n=1}^{M} \int E_n(\omega) \cdot F_n^{-1}(a_n, r = (x, y, z)^T, \omega) d\omega \right|.$$

8. The method according to claim 7, wherein an ultimate reconstruction rule is provided as:

$$b(x, y, z) = \left| \sum_{n=1}^{M} e_n(t = \tau_n) \right|.$$

9. The method according to claim 1, further comprising: utilizing the synthetic aperture via a reverse calculation of known positions of the mobile station to an unknown position of the stationary station.

10. The method according to claim 1, further comprising: calculating distance and angle information between the mobile station and the stationary station.

11. The method according to claim 10, wherein the mobile station is a secondary radar and the stationary station is a transponder.

12. The method according to claim 10, further comprising: merging, with a Kalman filter for one or more positions, the distance and angle data of one or more mobile stations.

13. The method according to claim 10, further comprising: executing the stationary stations as passive back-scatter tags; and
providing an absolute position determination according to distance and angle relative to the mobile station.

14. The method according to claim 1, further comprising: repeating the steps to improve the position determination of the mobile station.

15. A device to increase measurement precision of a radio-based position determination system, comprising:
a mobile station;
at least one stationary station;
an absolute sensor system generated from at least one secondary radar and at least one transponder;
at least one relative sensor system provided for quantification of a magnitude and a direction of a position change of the mobile station relative to an original position;
a signal processing device for common processing of measurement data acquired via the absolute sensor system and the relative sensor system for generation of a virtual antenna in a form of a synthetic aperture, wherein either: a) the mobile station is the secondary radar and the at least one stationary station is the transponder or; b) the mobile station is the transponder and the at least one stationary station is the secondary radar; and
a focusing device for focusing one to the other of at least one of: a) the mobile station on the stationary station and b) the stationary system on the mobile station based on the synthetic aperture.

16. The device according to claim 15, wherein the mobile station is formed by a transponder and the at least one stationary station is formed by a secondary radar.

17. The device according to claim 16, further comprising: a data transmission device for transfer of data from at least one secondary radar to the signal processing device.

18. The device according to claim 15, further comprising: a data transmission device for transfer of data from at least one secondary radar to the signal processing device.

19. The device according to claim 15, further comprising: a Kalman filter for rough prediction of a position value of a stationary station, which rough prediction serves as prior information.

20. The device according to claim 15, wherein the positioning system is an RTOF (round trip time of flight) or a TOA (time of arrival) radio positioning system.

\* \* \* \* \*